US010674545B2

(12) United States Patent
Li et al.

(10) Patent No.: US 10,674,545 B2
(45) Date of Patent: Jun. 2, 2020

(54) CONNECTION ESTABLISHMENT METHOD AND DEVICE

(71) Applicant: ALIBABA GROUP HOLDING LIMITED, Grand Cayman (KY)

(72) Inventors: Dongkun Li, Hangzhou (CN); Chaofeng Meng, Hangzhou (CN); Ke Wang, Hangzhou (CN)

(73) Assignee: Alibaba Group Holding Limited, Grand Cayman (KY)

( * ) Notice: Subject to any disclaimer, the term of this patent is extended or adjusted under 35 U.S.C. 154(b) by 183 days.

(21) Appl. No.: 15/662,637

(22) Filed: Jul. 28, 2017

(65) Prior Publication Data

US 2017/0325271 A1 Nov. 9, 2017

Related U.S. Application Data

(63) Continuation of application No. PCT/CN2016/073145, filed on Feb. 2, 2016.

(30) Foreign Application Priority Data

Feb. 9, 2015 (CN) .......................... 2015 1 0068088

(51) Int. Cl.
H04W 76/10 (2018.01)
H04W 84/18 (2009.01)
(Continued)

(52) U.S. Cl.
CPC ........... *H04W 76/10* (2018.02); *H04W 4/023* (2013.01); *H04W 4/40* (2018.02); *H04W 48/16* (2013.01);
(Continued)

(58) Field of Classification Search
CPC ..... H04W 76/10; H04W 76/11; H04W 48/02; H04W 48/16
See application file for complete search history.

(56) References Cited

U.S. PATENT DOCUMENTS 5,533,110 A 7/1996 Pinard et al.
6,041,103 A 3/2000 La Porta et al.
(Continued)

FOREIGN PATENT DOCUMENTS

CN 102088698 A 6/2011
CN 102137188 A 7/2011
(Continued)

OTHER PUBLICATIONS

Chinese First Search dated Mar. 19, 2018, issued in Chinese Application No. 201510068088.5 (2 pages).
(Continued)

*Primary Examiner* — Nam T Tran
(74) *Attorney, Agent, or Firm* — Sheppard Mullin Richter & Hampton LLP

(57) ABSTRACT

A connection establishment method includes receiving a service connection request sent by a first client, wherein the service connection request comprises a service identifier and a client identifier of a second client requested for connection, acquiring connection reference information, and when it is determined that the connection reference information satisfies a service restriction condition corresponding to the service identifier, establishing a connection between the first client and the second client corresponding to the client identifier.

15 Claims, 4 Drawing Sheets

(51) Int. Cl.
*H04W 4/02* (2018.01)
*H04W 4/40* (2018.01)
*H04W 48/16* (2009.01)
*H04W 76/12* (2018.01)
*H04W 76/11* (2018.01)
*H04W 88/16* (2009.01)

(52) U.S. Cl.
CPC ............ *H04W 84/18* (2013.01); *H04W 76/11* (2018.02); *H04W 76/12* (2018.02); *H04W 88/16* (2013.01)

(56) References Cited

U.S. PATENT DOCUMENTS

| | | | |
|---|---|---|---|
| 6,542,749 B2 * | 4/2003 | Tanaka | H04W 76/40 455/456.1 |
| 6,718,021 B2 | 4/2004 | Crockett et al. | |
| 6,889,213 B1 * | 5/2005 | Douvikas | G06F 21/6227 705/67 |
| 6,901,139 B2 | 5/2005 | Gonzalez et al. | |
| 7,082,190 B2 | 7/2006 | Simpson et al. | |
| 7,103,167 B2 | 9/2006 | Brahm et al. | |
| 7,162,019 B1 | 1/2007 | Mullis et al. | |
| 7,170,883 B2 | 1/2007 | Harris et al. | |
| 7,184,527 B1 | 2/2007 | Lin et al. | |
| 7,860,230 B2 | 12/2010 | Martin | |
| 8,090,084 B2 | 1/2012 | Feng et al. | |
| 2002/0188684 A1 | 12/2002 | Liang | |
| 2005/0287997 A1 | 12/2005 | Fournier | |
| 2006/0258340 A1 | 11/2006 | Eronen | |
| 2008/0240081 A1 * | 10/2008 | Sindhwani | H04M 3/436 370/352 |
| 2009/0046844 A1 | 2/2009 | Gonzalez et al. | |
| 2009/0327501 A1 | 12/2009 | Athsani et al. | |
| 2010/0081419 A1 | 4/2010 | Chiang et al. | |
| 2011/0096914 A1 | 4/2011 | Eng et al. | |
| 2012/0023247 A1 | 1/2012 | Minamizawa | |
| 2012/0140907 A1 | 6/2012 | Eng et al. | |

FOREIGN PATENT DOCUMENTS

| | | |
|---|---|---|
| JP | 2002-252704 A | 9/2002 |
| JP | 2002-345024 A | 11/2002 |
| JP | 2003-078624 A | 3/2003 |
| JP | 2004-274196 A | 9/2004 |
| JP | 2004-287850 A | 10/2004 |
| JP | 2005-033318 A | 2/2005 |
| JP | 2008-072329 A | 3/2008 |
| KR | 2011-0030577 A | 3/2011 |
| KR | 10-2012-0042110 A | 5/2012 |
| KR | 101389506 B1 | 4/2014 |
| KR | 10-2014-0142389 A | 12/2014 |
| WO | 2010119976 A1 | 10/2010 |
| WO | 2012/007018 A1 | 1/2012 |

OTHER PUBLICATIONS

Korean First Office Action dated Jul. 16, 2018, issued in Korean Application No. 10-2017-7024553 (12 pages).
PCT International Preliminary Report on Patentability dated Aug. 24, 2017, issued in International Application No. PCT/CN2016/073145 (8 pages).
International Search Report and Written Opinion for International Application No. PCT/CN2016/073145, dated Apr. 27, 2016, 8 pages.
First Office Action for Japan Patent application 2017-541807, dated Oct. 30, 2018 , 7 pages.
Chinese Supplementary Search dated Aug. 28, 2018, issued in Chinese Application No. 201510068088.5 (1 page).
Notice of Decision for Rejection dated Dec. 21, 2018, issued in Korean Application No. 10-2017-7024553 (9 pages).
Chinese Third Office Action dated Feb. 1, 2019, issued in Chinese Application No. 201510068088.5 with English machine translation (20 pages).
Notice of Allowance dated Feb. 21, 2019, issued in Korean Application No. 10-2017-7024553 (3 pages).
Chinese Fourth Office Action dated Dec. 2, 2019, issued in Chinese Application No. 201510068088.5 with English machine translation (10 pages).
Examination Report for Indian Application No. 201747027155 dated Mar. 2, 2020.

* cited by examiner

CONNECTION ESTABLISHMENT METHOD AND DEVICE

CROSS-REFERENCE TO RELATED APPLICATIONS

This application is a continuation application of International Application No. PCT/CN2016/073145, filed on Feb. 2, 2016, which claims priority to and benefits of Chinese Patent Application No. 201510068088.5 filed on Feb. 9, 2015. The contents of the above-referenced applications are incorporated herein by reference in their entirety.

TECHNICAL FIELD

The present invention relates to network technologies, and in particular to a method and a device for establishing a connection.

BACKGROUND

Such a scenario occurs frequently: a user A, for example, a smart phone user, needs to contact a user B for a matter, but user A does not have the contact information of user B and is unable to get in touch with user B. As a result, the matter cannot proceed smoothly. From a point of view of user B, he/she may not like to be bothered by any random contact, but would like to receive contacts only for the above-mentioned type of matter. The current technology often cannot meet the needs of both user A and user B.

SUMMARY

In view of the above, the present disclosure provides a method and a device for establishing a connection required for service processing. According to one aspect, a connection establishment method is provided. In one embodiment, the method includes receiving a service connection request from a first client, wherein the service connection request comprises a service identifier and a client identifier of a second client requested for connection, acquiring connection reference information, and, when it is determined that the connection reference information satisfies a service restriction condition corresponding to the service identifier, establishing a connection between the first client and the second client.

According to another aspect, the present disclosure provides a connection establishment method, which can be carried out by a first client. In one embodiment, the method includes sending, to a server, a service connection request, wherein the service connection request comprises a service identifier and a client identifier of a second client requested for connection, and establishing, when the server determines that connection reference information satisfies a service restriction condition corresponding to the service identifier, a connection via the server with the second client.

According to another aspect, the present disclosure provides a connection establishment device. In one embodiment, the device includes a request receiving module, configured to receive a service connection request from a first client, wherein the service connection request comprises a service identifier and a client identifier of a second client requested for connection, a connection processing module, configured to acquire connection reference information, and when it is determined that the connection reference information satisfies a service restriction condition corresponding to the service identifier, establish a connection between the first client and the second client.

According to a further aspect, the present disclosure provides another connection establishment device. In one embodiment, the device includes a request sending module, configured to send, to a server, a service connection request, wherein the service connection request comprises a service identifier and a client identifier of a second client requested for connection, and a connection establishment module, configured to establish, when the server determines that connection reference information satisfies a service restriction condition corresponding to the service identifier, a connection via the server with the second client.

According to the method and the device for establishing connection in embodiments of the present application, a connection between two clients is established when connection reference information satisfies a service restriction condition corresponding to the service identifier, which realizes a connection required for service processing.

DETAILED DESCRIPTION OF THE INVENTION

The connection establishment method according to embodiments of the present application is applied to connection establishment when a service is to be performed between a user A and a user B and a service restriction condition is satisfied. Application scenarios that the connection establishment method is applicable to will be briefly described with the following two scenarios as examples.

For example, a user Zhang parks his car by a road to go shopping. However, Zhang forgets to leave his contact information on the car; a user Wang drives by but has to stop, as Zhang's car needs to be moved out of his way. In such a scenario, a situation arises that Wang needs to contact Zhang. A connection request caused by such a "car-moving" need may be called a "car-moving" service, and the request by Wang to connect with Zhang is caused by the car-moving service.

For another example, Zhang waits in a line for eating in a restaurant in a mall. There are many people in the line with the issued waiting number reaching 100, and there are 50 people before Zhang in the line. Zhang thinks that the wait time is too long, so he goes around in the mall without leaving his contact information with the restaurant; when it reaches almost Zhang's number, the restaurant wants to contact Zhang and reminds him to return as quickly as possible. In such a scenario, a situation arises that the restaurant needs to contact Zhang. A connection request caused by such a "queuing" need may be called a "queuing" service, and the request by the restaurant to connect with Zhang is caused by the queuing service.

Figure 1:
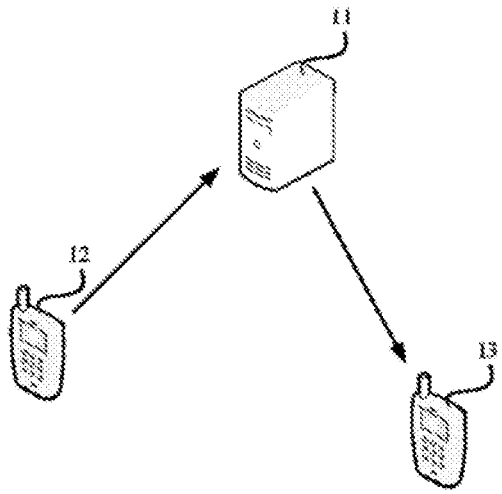
FIG. 1 illustrates a system architecture of a connection establishment method according to an embodiment of the present application.

Certainly, there are many similar examples, which will not be listed in detail. It can be seen from the examples above that the goal of the connection establishment method according to embodiments of the present application is to achieve connection establishment when a service is to be processed between a user A and a user B, such that Wang can get in touch with Zhang for him to come back to move the car, or the restaurant can get in touch with Zhang for him to come back to eat in the restaurant. To Zhang, moreover, he is only contacted due to a need for a service, such as car moving or queuing, and he will not be bothered randomly. Here, the term "service" should be understood broadly. It generally refers to a matter, a business, a transaction, or an action that needs to be taken, etc. The connection establishment method according to embodiments of the present application involves a system architecture shown in FIG. 1. As shown in FIG. 1, the system comprises a server 11, a first client 12, and a second client 13.

The first client 12 and the second client 13 may be clients corresponding, respectively, to a user A and a user B to be connected, while the server 11 is a server corresponding to these clients. As an example, in the car-moving scenario above, both Zhang and Wang can install an "Alipay Wallet" software application on their smart phones. The Alipay Wallet on Zhang's smart phone may be referred to as the first client, the Alipay Wallet on Wang's smart phone may be referred to as the second client, and correspondingly, the server 11 is an Alipay server that serves the Alipay Wallet applications. The connection establishment is realized for the car-moving service through cooperation between the Alipay server and the Alipay Wallets. As another example, in the queuing scenario above, the restaurant may install an Alipay Wallet on its terminal, and Zhang also installs an Alipay Wallet on his cell phone. The connection establishment is similarly realized for the queuing service through cooperation between the Alipay server and the Alipay Wallets.

It should be noted that the first client and the second client may not necessarily be the Alipay Wallets above. Embodiments of the present application do not limit the form of clients or servers. They just need to be capable of implementing the connection establishment method according to the embodiment. Clients can be other applications on smart phones, personal computers, tablet computers, or any other computing devices.

Figure 2:
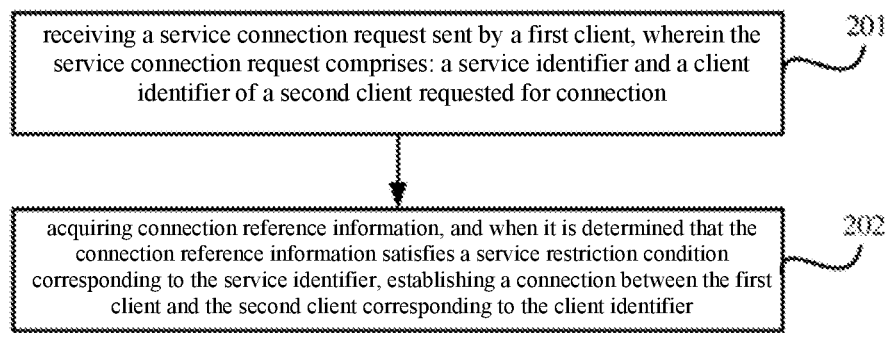
FIG. 2 is a flow chart of a connection establishment method according to an embodiment of the present application.

An implementation flow of the connection establishment method according to an embodiment of the present application will be first described below, and then applications of the method will be specifically described with reference to the car-moving scenario and the queuing scenario mentioned above. Referring to FIG. 2, an implementation flow of the connection establishment method according to one embodiment is illustrated. The method can be implemented by a server. The method includes:

Step 201. receiving a service connection request sent by a first client, the service connection request including a service identifier and a client identifier of a second client requested for connection, Step 202. acquiring connection reference information, and when it is determined that the connection reference information satisfies a service restriction condition corresponding to the service identifier, establishing a connection between the first client and the second client corresponding to the client identifier.

Figure 3:
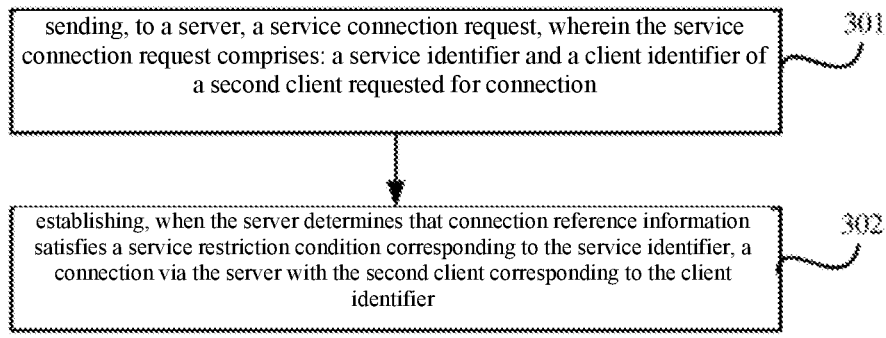
FIG. 3 is a flow chart of another connection establishment method according to an embodiment of the present application.

FIG. 3 illustrates an implementation flow of the connection establishment method according to one embodiment of the present disclosure. The method is implemented by a client, comprising:

Step 301. sending, to a server, a service connection request. The service connection request comprises: a service identifier and a client identifier of a second client requested for connection;

Step 302. establishing, when the server determines that connection reference information satisfies a service restriction condition corresponding to the service identifier, a connection via the server with the second client corresponding to the client identifier.

Figure 5:
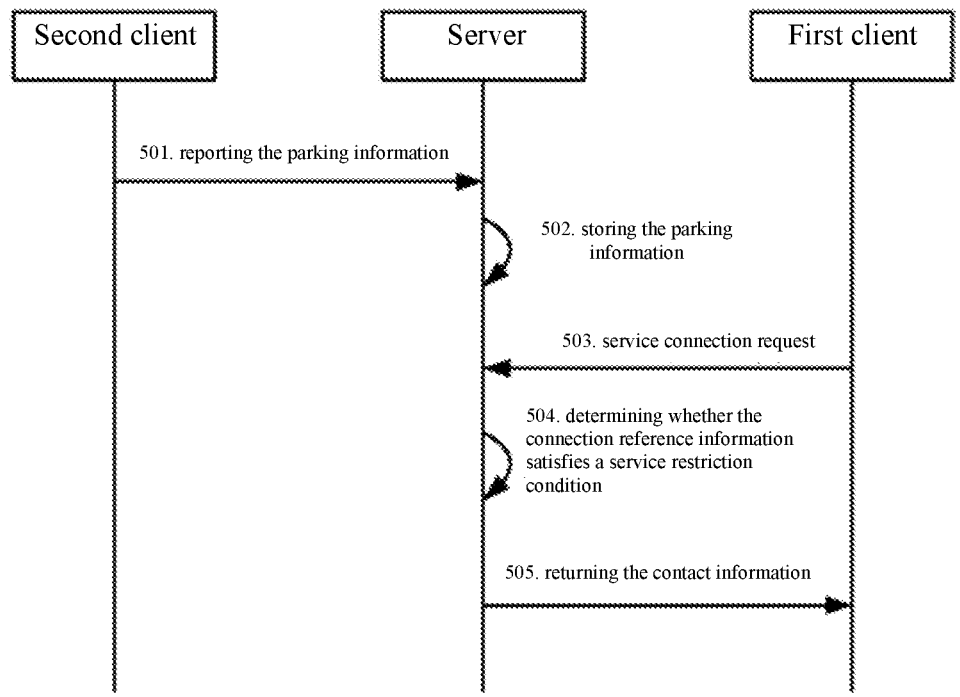
FIG. 5 is a flow chart of yet another connection establishment method according to an embodiment of the present application.

In the steps 201 and 301, a service connection request may be sent by the first client to the server. With the use of an Alipay client in the car-moving scenario as an example, a function option, "car moving", may be set up in the "Alipay Wallet" of the client. When Wang who desires a car to be moved selects the function option, "car moving", the client sends, to a server, a service connection request. Since the request sending is triggered by clicking the function option, "car moving", the request may carry information for identifying the "car moving" service, e.g. "01", which is equivalent to a service identifier. Alternatively, when Wang selects the function option, "car moving", some sub-menus comprised in the function are displayed. A request sent by operations performed under these sub-menus may also carry a car-moving service identifier. In this scenario, the client identifier carried in the service connection request is, for example, a license plate number. See the embodiment shown in FIG. 5 below for details.

In addition, the client identifier of a second client requested for connection carried in the service connection request above is used to let the server know that the target object to be connected by the first client is the second client. With the use of an Alipay client in the queuing scenario as an example, an Alipay Wallet can be installed on the terminal of the restaurant, and a function option, "queuing", is set up in the Alipay Wallet. The function option, "queuing", can provide a two-dimensional barcode for queuing; when Zhang waits in a line for eating in the restaurant, he can scan the two-dimensional barcode for queuing using the Alipay Wallet on his cell phone. After the Alipay Wallet scans the two-dimensional barcode mentioned above, the terminal of the restaurant can acquire the identifier of Zhang's Alipay Wallet, e.g. the account number of the Alipay Wallet, and the account number can be referred to as the client identifier. When the restaurant sends a service connection request to the server through its queuing function, the client identifier can be carried in the request. In such a scenario, the service identifier carried in the service connection request is information used to represent the queuing function. For example, if a waiter enters the function option, "queuing", in the Alipay Wallet installed on the queuing terminal of the restaurant to process the queuing service, a connection request, when sent from the interface of the service, can automatically carry an identifier corresponding to the "queuing" function, i.e. the service identifier.

In the step 202, upon receiving the service connection request, the server may acquire connection reference information, and determine whether the connection reference information satisfies a service restriction condition corresponding to the service identifier. If the service restriction condition is satisfied, the server can allow a connection to be established between the first client and the second client.

With the car-moving scenario as an example again, Zhang who parks his car does not want to be contacted randomly, but is willing to be contacted when other people need his car to be moved. Therefore, the service restriction condition may be set, according to the characteristic of car-moving situations, to "the cars of Zhang and Wang are within a distance of 100 m". In the case where a car needs to be moved, it is usually because the parked car blocks a road, and the blocked car is relatively close to the parked car. Moreover, the service restriction condition, "the cars of Zhang and Wang are within a distance of 100 m", has been quantified to further facilitate judgment, and can be set to "the distance between a first client and a second client is within 100 m." The position of the first client may be the position that Zhang reports to the server via the first client while parking the car, i.e. the position where the car is parked; the position of the second client is the position reported by Wang to the server via the second client when Wang's car is blocked. In this example, the position information reported by the first client and the second client may be referred to as connection reference information, a basis on which the server determines whether the service restriction condition is satisfied. There may be a variety of ways for the server to acquire the connection reference information, for example, the client takes the initiative to report or the server sends a notice asking the client to report.

In addition, there may also be a variety of ways for the server to establish a connection between the first client and the second client corresponding to the client identifier. For example, as a forwarding device between the first client and the second client, the server may directly send the message to be sent by the first client to the second client; alternatively, the server may provide the pre-stored contact information of the second client to the first client, such that the first client contacts the second client separately without forwarding via the server. In such a case, for example, the telephone number of Zhang corresponding to the second client is sent to the first client, and upon acquiring the telephone number, the user Wang of the first client makes a phone call to Zhang directly. At this moment, it is actually a contact between users corresponding to the clients. For the purpose of simple description, they are collectively referred to as connection between a first client and a second client in the embodiments of the present application. Other connection ways also can be used in the embodiments of the present invention, which are not described in detail.

With the connection establishment method according to the embodiment of the present application, a server controls, when a service restriction condition is satisfied, two clients to establish connection, thereby realizing that a user can, as long as the client is installed, request the server for connection through a function option set in the client. Specific applications of the connection establishment method will be described below with reference to examples of a few scenarios.

Figure 4:
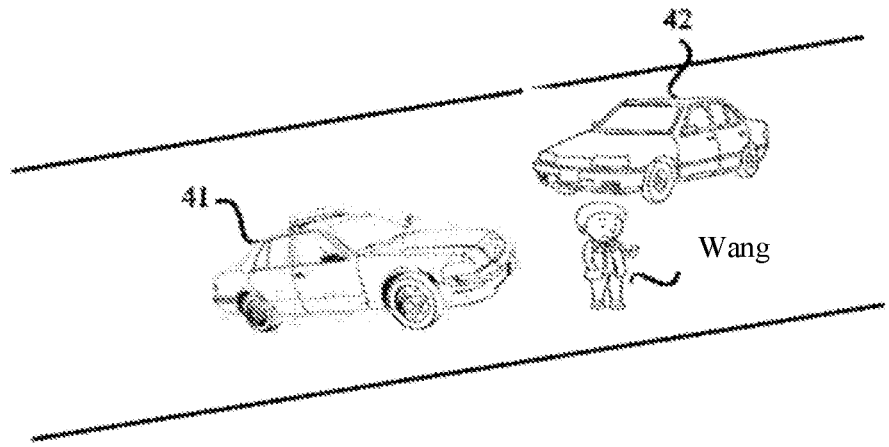
FIG. 4 illustrates a scenario of moving a car for a connection establishment method according to an embodiment of the present application.

As an example, referring to the car-moving scenario shown in FIG. 4, Zhang parks his car 41 by a road, Wang drives his car 42 to pass the same location and finds that Zhang's car blocks the road and needs to be moved away. At this moment, Wang begins to contact Zhang. With reference to the implementation flow shown in FIG. 5, and assuming that a second client is installed on Zhang's cell phone, a first client is installed on Wang's cell phone, the clients being Alipay Wallets as an example, then the entire processing flow from the moment when Zhang begins to park the car to the moment when Wang contacts Zhang may comprise:

Step 501. The second client reports the parking information to the server, the parking information comprising connection reference information;

In this embodiment, the parking information may include two parts: a client identifier of the second client and the connection reference information.

Here, the client identifier of the second client is information used to identify the second client. For example, if the second client is an Alipay Wallet, then the client identifier could be an account number of the Alipay Wallet, or could be some information with a corresponding relationship to the second client. For example, the server side stores a corresponding relationship between Alipay Wallets of users and license plate numbers of users, and then the server can find a corresponding Alipay Wallet according to a license plate number. In such a case, the license plate number is also referred to as a client identifier of a second client in this embodiment. For another example, the server side stores a corresponding relationship between Alipay Wallets of users and queuing numbers of users. If the server is notified of a user's queuing number, and the server can find the Alipay Wallet of the user according to the queuing number. Then, the user's queuing number may also be referred to as a client identifier. In other words, the client identifier in the embodiments of the present disclosure may comprise the client's own information (e.g. an account number of the Alipay Wallet), or information with a corresponding relationship to the client (e.g. a license plate number corresponding to the Alipay Wallet).

The connection reference information is used by the server when making a determination of a service restriction condition. For example, when the server determines whether a service restriction condition required for service connection establishment is met, the connection reference information is needed. For example, the connection reference information in this embodiment could be the parking position information, and the server may determine, according to the position information, whether it is in a position range; alternatively, the connection reference information may be time information in other scenarios.

Figure 6:
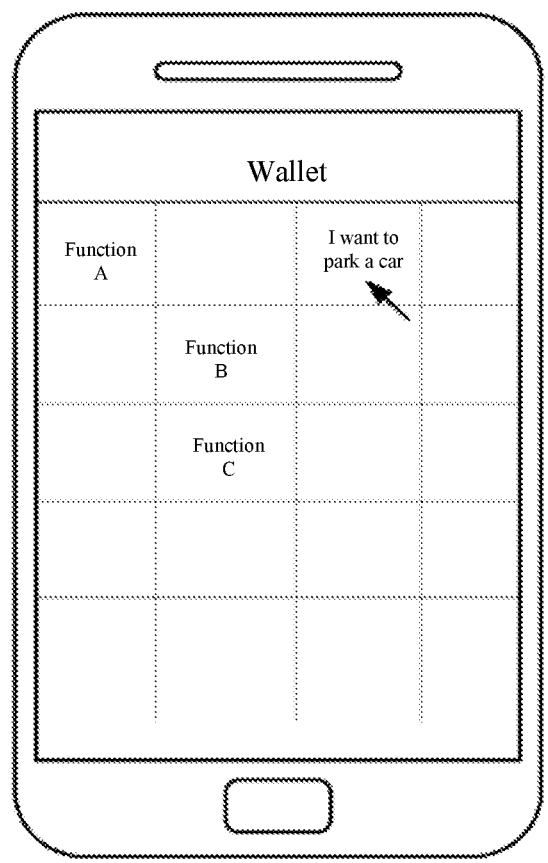
FIG. 6 is a schematic diagram of an interface of a connection establishment method according to an embodiment of the present application.

For example, when Zhang has parked his car 41, he turns on the second client on the cell phone, i.e. the Alipay Wallet. FIG. 6 illustrates the display interface of a part of the Alipay Wallet. The interface comprises many application functions and one of the function options is "I want to park a car". Zhang chooses this function, which triggers the Alipay Wallet client to report the parking information to the server.

The parking information in this embodiment may comprise: a second client identifier (e.g. an account number of the Alipay Wallet, the license plate number of Zhang's car), and the parking position of Zhang's car. With respect to the license plate number, an input page may be displayed after Zhang clicks the function, "I want to park a car", for Zhang to input his own license plate number; with respect to the parking position, it could be that the second client activates a positioning function, for example, a map application, to acquire the position information, and the position information could be longitude and latitude coordinates. The parking position information may be referred to as connection reference information. The parking position of Zhang's car reported in this step will be used in the subsequent determination of a service restriction condition by the server.

Step 502. The server stores the parking information reported by the second client;

For example, in this step, the server stores a corresponding relationship such as a corresponding relationship between an account number of the Alipay Wallet, the license plate number of Zhang's car, and the parking position of Zhang's car; moreover, the server side could usually acquire contact information of the user Zhang corresponding to the second client, e.g. a telephone number, during registration of the second client, and the telephone number can be bundled to the second client identifier, i.e. the server side can also bundle Zhang's telephone number into the above corresponding relationship.

Step 503. The server receives a service connection request sent by a first client. The service connection request may include a service identifier and a client identifier of a second client requested for connection;

For example, Wang, who wants a car to be moved, can turn on the first client on his cell phone, i.e. the Alipay Wallet, and an interface similar to the one shown in FIG. 6 will also be displayed on the Alipay Wallet. The interface further comprises a function, "car moving". When Wang clicks the function option, "car moving", an input box or a sub-interface can be popped up for Wang to input the license plate number of the car that he wants to be moved. Here, Wang will input the license plate number of Zhang's car and click Send to send a service connection request to the server. As described in Step 501 above, since the server stores a corresponding relationship between license plate numbers and Alipay Wallet accounts, the license plate number of Zhang's car input by Wang in this step may be referred to as the "client identifier of a second client". The service identifier carried in the request is information representing the "car-moving" service.

In this step, moreover, after Wang chooses the function option, "car moving", the first client can further automatically acquire position information that is carried in the service connection request and reported to the server. The position information is equivalent to Wang's current position, and the position information is also connection reference information for subsequent determination by the server.

Step 504. The server determines whether the connection reference information satisfies a service restriction condition corresponding to the service identifier;

For example, the server may determine, according to the position information reported by the first client and the second client, respectively, whether the two satisfy a distance threshold. The service restriction condition is a distance range threshold corresponding to the position information. For example, the service restriction condition corresponding to the car-moving service is that "the distance between the two is within a range of 100 m", and the condition can be pre-stored in the server.

According to the license plate number in the service connection request and the corresponding relationship stored in Step 502, the server acquires the first position information corresponding to the license plate number, i.e. the parking position of Zhang's car, and determines whether the distance between the first position information corresponding to the first client and the second position information reported by the second client is less than 100 m. If yes, the service restriction condition is satisfied, and Step 505 will be subsequently performed; otherwise, the service restriction condition is not satisfied, and the server can return a prompt like "connection rejected" to the first client.

Step 505. The server sends the contact information of the second client corresponding to the client identifier to the first client;

For example, when determining that the service restriction condition is satisfied, the server may acquire, according to the corresponding relationship stored in Step 502, the contact information of Zhang, such as a telephone number, and sends Zhang's telephone number to the first client. At this point, the telephone number is actually the contact information of the user of the second client, and the user Wang of the first client can establish a phone connection with the user Zhang of the second client.

Optionally, the server may also directly establish a connection between the first client and the second client. For example, when Wang chooses the "car-moving" function through the first client and triggers the first client to send the service connection request to the server, the server can find corresponding Zhang's telephone number according to the license plate number carried in the request, and automatically send a message (e.g. a car-moving prompt message) to the telephone number, which can also be treated as connection establishment between the two clients. Alternatively, the server can send a car-moving prompt message to Zhang's Alipay Wallet that is found according to the license plate number, to prompt Zhang to come back and move the car. In addition, other manners may be used, which will not be listed, as long as they can achieve the connection between Zhang and Wang.

Furthermore, when the server finds corresponding Zhang's telephone number according to the license plate number carried in the request as described above, a piece of identification information corresponding to the telephone number (which may be referred to as a "small number") can be generated, for example, the identification information "12589" is used to correspond to Zhang's telephone number, and "12589" is returned to the first client. When Wang contacts the identification information "12589", for example, a connection instruction sent by the first client is received, and the connection instruction carries the identification information, based on which the server sends a message or voice message to the telephone number corresponding to the identification information. By this way, Zhang's telephone number can be kept confidential, leading to better security.

As an example, another application scenario is also a car-moving scenario, which is similar to the scenario shown in FIG. 4. The difference is in that only a function option, "car moving", to be used by car-moving users is set up in the Alipay Wallet, and the function option, "I want to park a car", may not be provided for parking users. Instead, another way is provided as a replacement. Specifically, Zhang who needs to park a car can set up a piece of hardware on his car, e.g. a Bluetooth chip. The Bluetooth chip can be referred to as a marker, and the Bluetooth chip comprises an ID to identify the chip, which can be referred to as a marker identifier.

When Wang wants the car to be moved, he can turn on his Alipay Wallet, i.e. the first client, and enters the "car moving" function of the Alipay Wallet. When the car-moving function is selected, Wang can be prompted to get close to Zhang's car. When the distance is short enough to meet conditions of Bluetooth communication, Wang's Alipay Wallet acquires the ID of the Bluetooth chip on Zhang's car by means of Bluetooth and sends a service connection request to the server. At this moment, the connection request carries the car-moving service identifier and the Bluetooth chip ID. In this embodiment, the Bluetooth chip ID can be, for the time being, referred to as a marker identifier of the second client, since the server side may have pre-stored the corresponding relationship between Zhang's account number of Alipay Wallet, the Bluetooth chip ID on the car, and Zhang's contact information.

At the server side, whenever it is found that the service connection request sent by the Alipay Wallet carries the Bluetooth chip ID, it indicates that Wang is already close to Zhang's car, as the ID can be acquired only when the distance is close enough. The server determines that the service restriction condition is satisfied. Subsequently, the server can acquire Zhang's contact information corresponding to the Bluetooth chip ID, and return the same to the first client for Wang to contact Zhang.

As an example, the method can be further applied to the queuing scenario. In a restaurant at a mall, Zhang goes to the restaurant to eat. He turns on his Alipay Wallet to scan the two-dimensional barcode for queuing at the queuing terminal at the reception desk of the restaurant. When he takes a queue number, he goes shopping in stores nearby. An Alipay Wallet can be installed on the queuing terminal at the reception desk of the restaurant, which provides a queuing function. The queuing function provides the above two-dimensional barcode for queuing. As Zhang scans and takes a number, the first client (the Alipay Wallet) on the queuing terminal of the restaurant acquires the identifier (e.g. an account number) of the second client, i.e. the Alipay Wallet, on Zhang's cell phone, and reports the identifier of Zhang's Alipay Wallet and the service identifier (i.e. the queuing service information) to the Alipay server.

Figure 7:
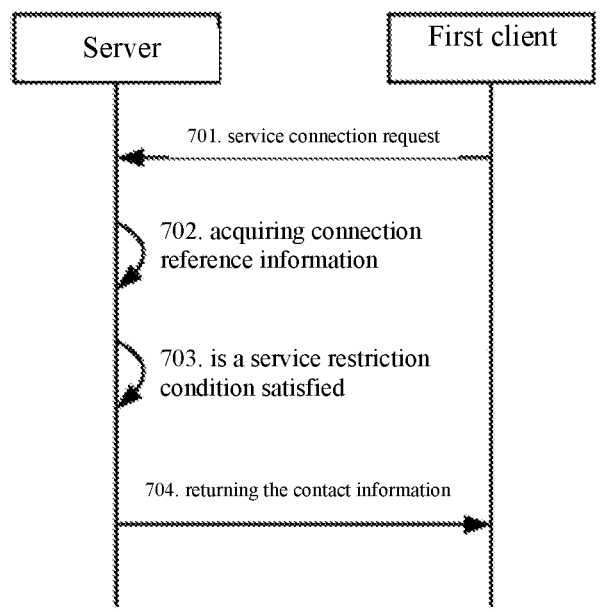
FIG. 7 is a flow chart of yet another connection establishment method according to an embodiment of the present application.

When it is close to Zhang's number, the restaurant contacts Zhang through the queuing function of the Alipay Wallet on its queuing terminal. FIG. 7 shows a flow of a method for implementing the above scenario. According to one embodiment, the method includes:

Step 701. the first client sends, to a server, a service connection request;

For example, the restaurant turns on the queuing function of the Alipay Wallet on its queuing terminal, and finds the information regarding Zhang's scanning and number taking previously. The queuing function of the Alipay Wallet can provide a trigger option for the restaurant to contact Zhang. For example, a "contact" button is added to the queue number of Zhang and displayed on the interface.

When a waiter of the restaurant clicks the "contact" button, the first client, i.e. the Alipay Wallet on the queuing terminal, will send, to a server, a service connection request carrying a service identifier representing the queuing service and a client identifier of the second client.

For example, the above "contact" button may be bundled with the account number of Zhang's Alipay Wallet that is acquired by the first client. When the waiter clicks the button, the account number of the Alipay Wallet and a service identifier (used to indicate that this is a queuing service) will be carried in the service connection request. The account number of the Alipay Wallet is equivalent to a client identifier of the second client.

For another example, prior to the performance of Step 701, after Zhang scans and takes a number, the first client on the queuing terminal will report the account number of Zhang's Alipay Wallet, the queue number and the service identifier all to the server. The server side will record the corresponding relationship between the information, including a corresponding relationship between the account number of the Alipay Wallet and the queue number. In such a situation, when the first client clicks the "contact" button to send a request, the request can carry the service identifier and the queue number, and the queue number may be referred to as a client identifier of the second client.

Step 702. the server acquires connection reference information;

For example, in this embodiment, it is assumed that the service restriction condition corresponding to the queuing service is that "the current time is within 3 hours after the time of number taking, and the current position of the second client is within the range of the geographic location of the business". In other words, the time when the restaurant contacts Zhang is within 3 hours after the time when Zhang takes a number at the restaurant, and moreover, Zhang's current position is not too far away from the restaurant, for example, within a range of 500 m.

The server needs to acquire connection reference information for making determination of a service restriction condition. The connection reference information comprises current time, Zhang's position, and the restaurant's location. Here, the current time can be easily obtained. With respect to acquiring Zhang's position, a positioning instruction may be sent, via the server, to the second client, i.e. Zhang's Alipay Wallet, and when Zhang's Alipay Wallet positions and acquires the position information, the position information is returned to the server. As for the restaurant's location, it can be stored in the server in advance. Certainly, other ways of acquisition may be available, and only one of them is listed herein.

Step 703. the server determines whether the connection reference information satisfies a service restriction condition;

For example, the server will determine whether the current time is within 3 hours (a time range threshold) after the time when Zhang takes the number, and the time when Zhang takes the number can be stored by the server when the restaurant client performs uploading in Step 701; moreover, the server will determine whether the distance between Zhang's current position and the restaurant is within 1000 m (a distance range threshold).

If the server determines that the connection reference information satisfies a service restriction condition, then proceed to Step 704;

Step 704. the server sends the contact information of the second client to the first client.

Optionally, the server may find Zhang's number according to the pre-stored corresponding relationship between Zhang's Alipay account number, Zhang's queue number and Zhang's contact information, and send the same to the first client for the business to contact Zhang. Alternatively, as described in the embodiment shown in FIG. 5, the server contacts Zhang directly.

Furthermore, to better meet the need of Zhang as a person to be contacted, the server may receive a service restriction condition uploaded by Zhang via the second client. For example, Zhang can set up, via the Alipay Wallet, a condition that he desires for contacting him. For example, "the current time is within 1 hour after the number-taking time" is set as a service restriction condition for contacting Zhang.

The above scenarios are just examples. The embodiments of the invention can be applied to many other scenarios, which are not described in the present application. All similar applications can use the connection establishment method according to the embodiment of the present application, and the method does not impose limitations on service restriction conditions or connection manners. For example, a service restriction condition may be limited within the same WiFi coverage, or limited within the same geographic range, or limited within the same Bluetooth coverage, or limited within the same permission range. The connection manner includes, but is not limited to, telephone connection, instant messaging connection, and payment connection. The term "connection" should be understood broadly to cover sending a message, telephone call, etc. The connection establishment method is implemented on the basis of clients and a server, and moreover, such a connection establishment corresponds to services and is a service connection initiated to realize a service. Moreover, a service restriction condition corresponding to the service needs to be satisfied. The method satisfies both the demand for performing the service, and the demand that the terminal to be connected will not be randomly bothered. Furthermore, these can be achieved very conveniently.

Figure 8:
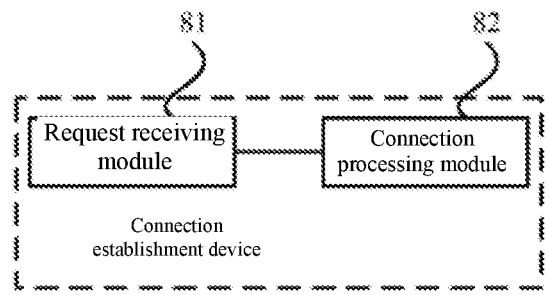
FIG. 8 illustrates a structural diagram of a connection establishment device according to an embodiment of the present application.

To implement the above method, the embodiment of the present application further provides a connection establishment device, and the device can be deployed or applied on a server. As shown in FIG. 8, the device can comprise: a request receiving module 81 and a connection processing module 82.

The request receiving module 81 is configured to receive a service connection request sent by a first client. The service connection request comprises a service identifier and a client identifier of a second client requested for connection;

The connection processing module 82 is configured to acquire connection reference information, and when it is determined that the connection reference information satisfies a service restriction condition corresponding to the service identifier, establish a connection between the first client and the second client corresponding to the client identifier.

The connection reference information may include one of the following: position information or time information. The connection processing module 82 is configured to send contact information of the second client corresponding to the client identifier to the first client, such that the first client establishes, according to the contact information, a connection with the second client. In some embodiments, the connection processing module 82 is specifically configured to send identification information corresponding to the contact information of the second client to the first client, and receive a connection instruction sent by the first client, the connection instruction carrying the identification information. The connection processing module 82 may be further configured to, connect, according to the contact information corresponding to the identification information, the first client with the second client.

Figure 9:
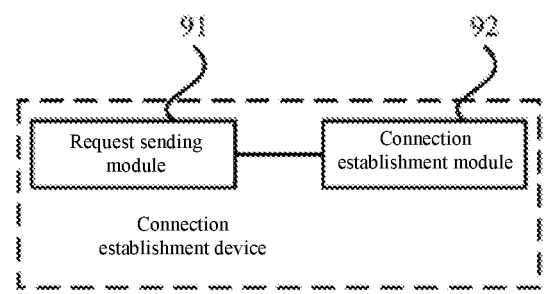
FIG. 9 illustrates a structural diagram of another connection establishment device according to an embodiment of the present application.

To implement the above method, the embodiment of the present application further provides a connection establishment device, and the device can be deployed or applied on a server. As shown in FIG. 9, the device can comprise: a request sending module 91 and a connection establishment module 92.

The request sending module 91 is configured to send, to a server, a service connection request. The service connection request comprises a service identifier and a client identifier of a second client requested for connection. The connection establishment module 92 is configured to establish, when the server determines that connection reference information satisfies a service restriction condition corresponding to the service identifier, a connection via the server with the second client corresponding to the client identifier.

Figure 10:
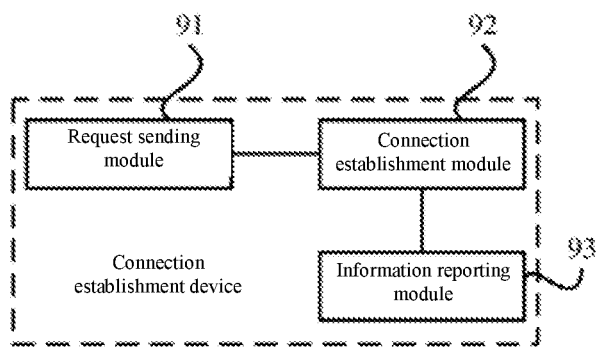
FIG. 10 illustrates a structural diagram of yet another connection establishment device according to an embodiment of the present application.

Referring to FIG. 10, the device can further comprise: an information reporting module 93, configured to send, to the server, the connection reference information or service restriction condition.

All the embodiments in this specification are described in a progressive manner, each embodiment focuses on the differences from the other embodiments, and reference may be made to each other for the same or similar parts of the embodiments.

A person skilled in the art can understand that, various exemplary logic blocks, units, modules, circuits, and algorithm steps described herein may be implemented as specialized electronic hardware, computer software, or a combination of electronic hardware and computer software. For examples, the steps and modules/units may be performed or implemented by one or more processors executing software instructions stored in the computer-readable storage medium to perform the specialized functions of the steps and modules/units.

The flowcharts and block diagrams in the accompanying drawings show system architectures, functions, and operations of possible implementations of the system and method according to multiple embodiments of the present invention. Each block in the flowchart or block diagram may represent one module/unit, one program segment, or a part of code, where the module/unit, the program segment, or the part of code includes one or more executable instructions used for implementing specified logic functions. It should also be noted that, in some alternative implementations, functions marked in the blocks may also occur in a sequence different from the sequence marked in the drawing. For example, two consecutive blocks actually can be executed in parallel substantially, and sometimes, they can also be executed in reverse order, which depends on the functions involved. Each block in the block diagram and/or flowchart, and a combination of blocks in the block diagram and/or flowchart, may be implemented by a dedicated hardware-based system for executing corresponding functions or operations, or may be implemented by a combination of dedicated hardware and computer instructions.

Embodiments of the present disclosure may take the form of a computer program product embodied in one or more tangible and/or non-transitory computer-readable storage media containing computer-readable instructions (e.g., program codes). The computer-readable instructions, when executed by one or more processors, cause the one or more processors to implement the steps and units/modules disclosed in the disclosure. The computer-readable storage medium may include volatile or non-volatile, magnetic, semiconductor, optical, removable, non-removable, or other types of computer-readable storage medium or computer-readable storage devices. Common forms of non-transitory computer-readable storage medium include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM or any other flash memory, NVRAM, a cache, a register, any other memory chip or cartridge, and networked versions of the same.

The computer-readable instructions may also be loaded onto a computer device (for example, a personal computer (PC), a server, a mobile device (e.g., smart phone), or a tablet device) and when the computer device executes the computer-readable instructions, for example, by one or more processors of the computer device, the computer device performs a series of operational steps/functions to implement the methods, functions, and units/modules illustrated and described in the flow diagrams and/or the block diagrams in this disclosure. In a typical configuration, a computer device includes one or more processors, an input/output interface, a network interface, and a memory. The memory may include any form of storage medium as discussed above. The memory can store the computer-readable instructions that can be executed by the processor in the computer.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The detailed description, therefore, is not to be taken in a limiting sense, and the scope of various embodiments is defined only by the appended claims, along with the full range of equivalents to which such claims are entitled.

The invention claimed is:

1. A connection establishment method, comprising:
   receiving, by a server, a service connection request from a first client, wherein the first client is an application on a terminal of a first user, wherein the service connection request comprises: a service identifier and a client identifier of a second client of a second user requested for connection, wherein the service identifier is included in the application and identifies an action requested by the first user to be performed by the second user, and wherein the client identifier is captured by the terminal of the first user;
   acquiring, by the server, connection reference information;
   determining, by the server, whether the connection reference information satisfies a service restriction condition corresponding to the service identifier,
   wherein the connection reference information comprises a distance between the first client requesting connection and a geographic location associated with the second client requested for connection, and the service restriction condition comprises a distance range threshold corresponding to the action, and
   when the distance is within the distance range threshold, the connection reference information satisfies the service restriction condition; and
   when it is determined that the connection reference information satisfies the service restriction condition corresponding to the service identifier, establishing a connection between the first user and the second user, wherein establishing the connection comprises:
      searching for contact information of the second user based on the client identifier of the second user, wherein the server stores corresponding relationships of client identifiers and contact information,
      generating identification information based on the contact information of the second user, the identification information representing and concealing contact information of the second user,
      sending the identification information to the first client user to enable the first user to contact the second user, and
      receiving, by the server, a connection instruction sent by the first user, the connection instruction carrying the identification information, the identification information enabling the server to contact the second user.

2. The method according to claim 1, wherein the connection reference information further comprises time information; and
   the service restriction condition corresponding to the service identifier further comprises a time range threshold corresponding to the time information.

3. The method according to claim 1, further comprising: receiving the service restriction condition from the second client.

4. The method according to claim 1, wherein the method further comprises: connecting, according to the contact information corresponding to the identification information, the first user with the second user.

5. The method according to claim 1, wherein the application is a payment application.

6. A connection establishment method, implementable by a first client, wherein the first client is an application on a terminal of a first user, comprising:
   sending, to a server, a service connection request, wherein the service connection request comprises: a service identifier and a client identifier of a second client of a second user requested for connection, wherein the service identifier is included in the application and identifies an action requested by the first user to be performed by the second user, and wherein the client identifier is captured by the terminal of the first user;
   establishing, when the server determines that connection reference information satisfies a service restriction condition corresponding to the service identifier, a connection via the server with the second user, wherein the establishing the connection via the server with the second user comprises:
      searching for contact information of the second user based on the client identifier of the second user, wherein the server stores corresponding relationships of client identifiers and contact information,
      receiving identification information of the second user, the identification information representing and concealing contact information of the second user, wherein the identification information enables the first user to contact the second user, and
      sending a connection instruction carrying the identification information, the identification information enabling the server to contact the second user,
   wherein the connection reference information comprises a distance between the first client requesting connection and a geographic location associated with the second client requested for connection, and the service restriction condition comprises a distance range threshold corresponding to the action, and
   when the distance is within the distance range threshold, the connection reference information satisfies the service restriction condition.

7. The method according to claim 6, further comprising: sending, to a server, the connection reference information.

8. The method according to claim 6, further comprising: sending, to a server, the service restriction condition information.

9. The method according to claim 6, wherein the application is a payment application.

10. A connection establishment device, comprising one or more processors and one or more non-transitory computer-readable memories coupled to the one or more processors and configured with instructions executable by the one or more processors to cause the device to perform operations comprising:

receiving, by a server, a service connection request from a first client, wherein the first client is an application on a terminal of a first user, wherein the service connection request comprises: a service identifier and a client identifier of a second client of a second user requested for connection, wherein the service identifier is included in the application and identifies an action requested by the first user to be performed by the second user, and wherein the client identifier is captured by the terminal of the first user;

acquiring, by the server, connection reference information;

determining, by the server, whether the connection reference information satisfies a service restriction condition corresponding to the service identifier, wherein the connection reference information comprises a distance between the first client requesting connection and a geographic location associated with the second client requested for connection, and the service restriction condition comprises a distance range threshold corresponding to the action, and when the distance is within the distance range threshold, the connection reference information satisfies the service restriction condition; and when it is determined that the connection reference information satisfies the service restriction condition corresponding to the service identifier, establishing a connection between the first user and the second user, wherein establishing the connection comprises:

searching for contact information of the second user based on the client identifier of the second user, wherein the server stores corresponding relationships of client identifiers and contact information, generating identification information based on the contact information of the second user, the identification information representing and concealing contact information of the second user, sending the identification information to the first user to enable the first user to contact the second user, and receiving, by the server, a connection instruction sent by the first user, the connection instruction carrying the identification information, the identification information enabling the server to contact the second user.

11. The device according to claim 10, wherein the connection reference information further comprises time information.

12. The device according to claim 10, wherein the operations further comprises:

connecting, according to the contact information corresponding to the identification information, the first user with the second user.

13. The device according to claim 10, wherein the application is a payment application.

14. A connection establishment device, comprising one or more processors and one or more non-transitory computer-readable memories coupled to the one or more processors and configured with instructions executable by the one or more processors to cause the device to perform operations comprising:

sending, by an application on the connection establishment device, to a server, a service connection request, wherein the connection establishment device is a terminal of a first user and the service connection request comprises: a service identifier and a client identifier of a second client of a second user requested for connection, wherein the service identifier is included in the application and identifies an action requested by the first user to be performed by the second user, and wherein the client identifier is captured by the connection establishment device;

establishing, when the server determines that connection reference information satisfies a service restriction condition corresponding to the service identifier, a connection via the server with the second user, wherein the establishing the connection via the server with the second user comprises:

searching for contact information of the second user based on the client identifier of the second user, wherein the server stores corresponding relationships of client identifiers and contact information, receiving identification information of the second user, the identification information representing and concealing contact information of the second user, wherein the identification information enables the first user to contact the second user, and sending a connection instruction carrying the identification information, the identification information enabling the server to contact the second user, wherein the connection reference information comprises a distance between the first client requesting connection and a geographic location associated with the second client requested for connection, and the service restriction condition comprises a distance range threshold corresponding to the action, and when the distance is within the distance range threshold, the connection reference information satisfies the service restriction condition.

15. The device according to claim 14, wherein the application is a payment application.

* * * * *

UNITED STATES PATENT AND TRADEMARK OFFICE
CERTIFICATE OF CORRECTION

PATENT NO. : 10,674,545 B2
APPLICATION NO. : 15/662637
DATED : June 2, 2020
INVENTOR(S) : Dongkun Li et al.

Page 1 of 1

It is certified that error appears in the above-identified patent and that said Letters Patent is hereby corrected as shown below:

In the Claims

Claim 1, Column 13, Line 63:
"identification information to the first client user" should read -- identification information to the first user --.

Signed and Sealed this
Thirty-first Day of October, 2023

Katherine Kelly Vidal
*Director of the United States Patent and Trademark Office*